US012735028B2

(12) United States Patent
Gevrekci et al.

(10) Patent No.: US 12,735,028 B2
(45) Date of Patent: Sep. 15, 2026

(54) MOBILE DEVICE CONTROL WITH GRID MAP OCCUPANCY DETERMINATION

(71) Applicant: Ford Global Technologies, LLC, Dearborn, MI (US)

(72) Inventors: Murat Gevrekci, Mountain View, CA (US); Ratnesh Kumar, Chino Hills, CA (US); Limin Wu, Campbell, CA (US); Ghassan Atmeh, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 18/746,547

(22) Filed: Jun. 18, 2024

(65) Prior Publication Data

US 2025/0381951 A1 Dec. 18, 2025

(51) Int. Cl.
*B60W 30/09* (2012.01)
*G06V 20/58* (2022.01)

(52) U.S. Cl.
CPC ............. *B60W 30/09* (2013.01); *G06V 20/58* (2022.01); *B60W 2420/403* (2013.01); *B60W 2554/80* (2020.02)

(58) Field of Classification Search
CPC ........... B60W 30/09; B60W 2420/403; B60W 2554/80; G06V 20/58
See application file for complete search history.

(56) References Cited

U.S. PATENT DOCUMENTS 11,255,958 B2 2/2022 Wang et al.
11,353,578 B2 6/2022 Wang et al.
2008/0027591 A1* 1/2008 Lenser ................. G05D 1/0038 701/28
2012/0053755 A1* 3/2012 Takagi .................. G01S 7/4808 701/1
2018/0121750 A1* 5/2018 Borkowski ........... G01S 13/931
2018/0189565 A1* 7/2018 Lukierski ............... B25J 9/1697
2020/0026277 A1* 1/2020 Palanisamy ......... B60W 60/001
2020/0409373 A1* 12/2020 Mordovanakis ..... G05D 1/0088

FOREIGN PATENT DOCUMENTS

CN 113963061 A 1/2022
KR 20210144404 A 11/2021

OTHER PUBLICATIONS

Tsubasa Okuya, Masaki Yoneda, and Takashi Ogawa, "Environment Recognition with FMCW-LiDAR-based Dynamic Occupancy Grid Mapping", Sep. 24-28, 2023 (Year: 2023).*

* cited by examiner

*Primary Examiner* — Jelani A Smith
*Assistant Examiner* — Hana Lee
(74) *Attorney, Agent, or Firm* — Frank A. MacKenzie; Brooks Kushman P.C.

(57) ABSTRACT

In a grid map, an occupancy region defined by a first contour representing a set of first points and a second contour representing a set of second points is generated. The set of first points is determined for respective rays extending from a source by determining a first point at which the respective ray intersects a distal boundary of the grid map or a proximal boundary of an occupied grid cell. The set of second points is determined for respective rays extending from the source by determining a second point at which the respective ray intersects the distal boundary of the grid map or a distal boundary of the occupied grid cell.

16 Claims, 4 Drawing Sheets

MOBILE DEVICE CONTROL WITH GRID MAP OCCUPANCY DETERMINATION

BACKGROUND

Computers can operate systems and devices including vehicles, robots, drones, and/or object tracking systems. Data including images can be acquired by sensors and processed by a computer to determine a location of a system with respect to an environment and with respect to objects in the environment. A computer may use the location data to determine one or more trajectories and/or actions for operating the system or components thereof in the environment.

DETAILED DESCRIPTION

Figure 1:
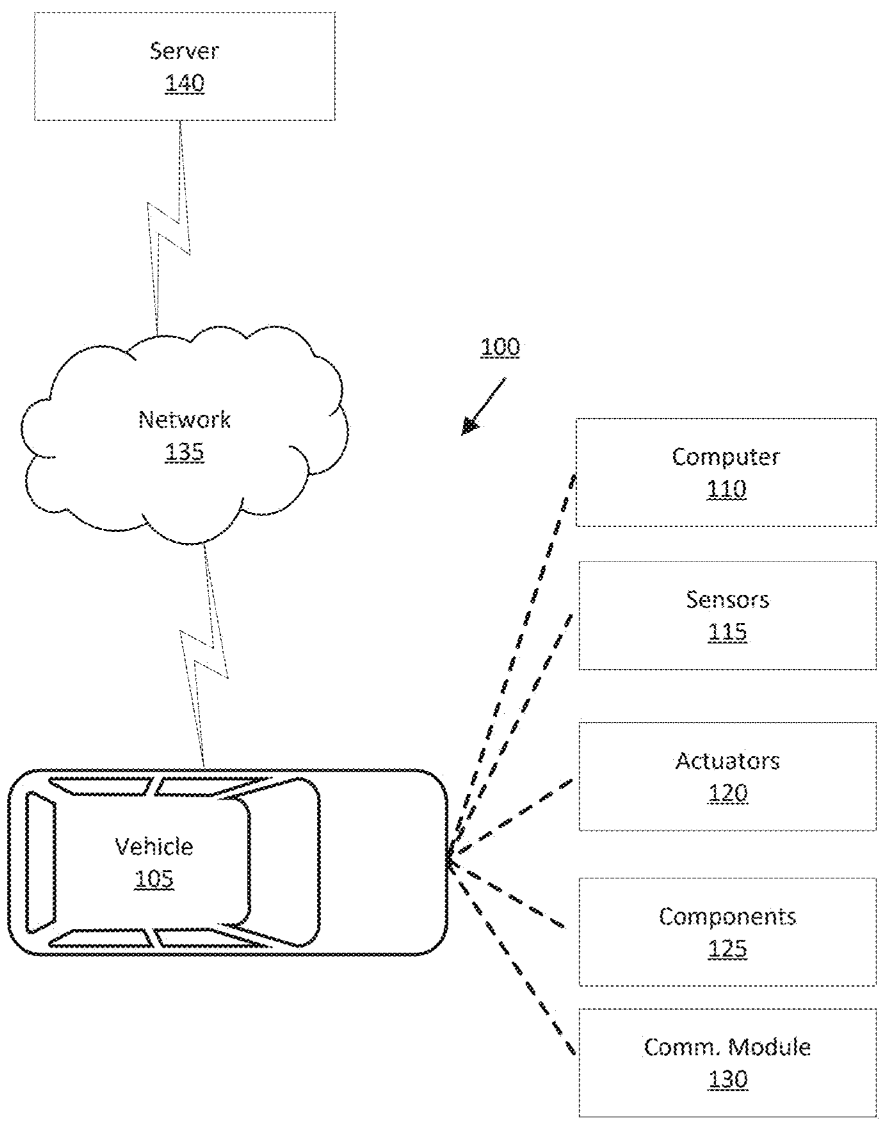
FIG. 1 is a block diagram illustrating an example vehicle control system.

Systems that move and/or that have mobile or movable components, including vehicles, robots, drones, cell phones etc., can be operated by acquiring sensor data, including data regarding an environment around the system, and processing the sensor data to determine locations of objects in the environment around the system. The determined location data could be processed to determine operation of the system or portions of the system. For example, a robot could determine the location of another nearby robot's arm. The determined robot arm location could be used by the robot to determine a path upon which to move a gripper to grasp a workpiece without encountering the other robot's arm. In another example, a vehicle could determine a location of another vehicle traveling on a roadway. The vehicle could use the determined location of the other vehicle to determine a path upon which to operate while maintaining a predetermined distance from the other vehicle. A vehicle will be used herein as a non-limiting example of a system that moves and/or has moveable components in description below.

A classifier that includes programming to utilize one or more conventional image classification techniques can be trained to identify objects in the environment around the system. For example, the classifier can use a machine learning technique in which data known to represent various objects, is provided to a machine learning program for training the classifier. Once trained, the classifier can accept as input sensor data (e.g., an image) and then provide as output, for each of one or more respective regions of interest in the image, an identification of an object or an indication that no object is present in the respective region of interest. In such an example, the classifier can represent identified objects via boxes or cuboids. However, the data provided for training may lack some types of objects, such that the classifier is unable to identify objects absent from the training data (i.e., unknown objects). In these situations, additional time and computational resources may be required to generate complex representations of the unknown objects as compared to boxes or cuboids that can represent known objects. Further, additional time and computational resources may be required to monitor the unknown object as compared to a known object when determining how to account for the unknown object while controlling a vehicle.

As described herein, a computer can generate, in a grid map, an occupancy region by sampling occupancy of the grid map using a plurality of rays. The occupancy region represents an area, which is determined from detected occupied grid cells, of the grid map that may include occupied grid cells. Generating the occupancy region from a plurality of rays allows the computer to monitor a reduced area of the environment around the vehicle for objects regardless of object classification, which can reduce an amount of time and computational resources required to detect and monitor objects in the environment around the vehicle.

A system includes a computer including a processor and a memory, the memory storing instructions executable by the processor to generate, in a grid map, an occupancy region defined by a first contour representing a set of first points and a second contour representing a set of second points. The sets of first and second points are determined for respective rays extending from a source by 1) determining a first point at which the respective ray intersects a distal boundary of the grid map or a proximal boundary of an occupied grid cell, and 2) determining a second point at which the respective ray intersects the distal boundary of the grid map or a distal boundary of the occupied grid cell.

The instructions can further include instructions to control a vehicle based on the occupancy region.

The instructions can further include instructions to generate an occupancy interval extending along the respective ray from the first contour to the second contour. The respective occupancy intervals may define respective radial positions of the occupancy region relative to the source. The grid map may include a plurality of grid cells specifying a probability of the respective grid cell being occupied by an object and a velocity of the object. The respective occupancy intervals may include an estimated occupancy based on statistical aggregation of the probabilities specified by the grid cells include in the respective occupancy interval. The respective occupancy intervals may include a first velocity corresponding to the velocity of the grid cell intersected by the first contour and a second velocity corresponding to the velocity of the grid cell intersected by the second contour. The respective occupancy intervals may include a velocity error determined based on a statistical aggregation of the first velocity and the second velocity.

The first point may be determined at which the respective ray intersects the boundary of the grid map based on an absence of the occupied grid cell along the respective ray. When the first point is determined at which the respective ray intersects the boundary of the grid map, the second point may be a same point as the first point.

The first contour may be represented by a first best fit line interpolated from the set of first points, and the second contour is represented by a second best fit interpolated from the set of second points.

A method includes generating, in a grid map, an occupancy region defined by a first contour representing a set of first points and a second contour representing a set of second points. The sets of first and second points are determined for respective rays extending from a source by 1) determining a first point at which the respective ray intersects a distal boundary of the grid map or a proximal boundary of an occupied grid cell, and 2) determining a second point at which the respective ray intersects the distal boundary of the grid map or a distal boundary of the occupied grid cell.

The method can further include controlling a vehicle based on the occupancy region.

The method can further include determining an occupancy interval extending along the respective ray from the first contour to the second contour. The respective occupancy intervals may define respective radial positions of the occupancy region relative to the sensor. The grid map may include a plurality of grid cells specifying a probability of the respective grid cell being occupied by an object and a velocity of the object. The respective occupancy intervals may include an estimated occupancy based on statistical aggregation of the probabilities specified by the grid cells include in the respective occupancy interval. The respective occupancy intervals may include a first velocity corresponding to the velocity of the grid cell intersected by the first contour and a second velocity corresponding to the velocity of the grid cell intersected by the second contour. The respective occupancy intervals may include a velocity error determined based on a statistical aggregation of the first velocity and the second velocity.

The first point may be determined at which the respective ray intersects the boundary of the grid map based on an absence of the occupied grid cell along the respective ray. When the first point is determined at which the respective ray intersects the boundary of the grid map, the second point may be a same point as the first point.

The first contour may be represented by a first best fit line interpolated from the set of first points, and the second contour is represented by a second best fit interpolated from the set of second points.

Further disclosed herein is a computing device programmed to execute any of the above method steps. Yet further disclosed herein is a computer program product, including a computer readable medium storing instructions executable by a computer processor, to execute an of the above method steps.

Figure 2:
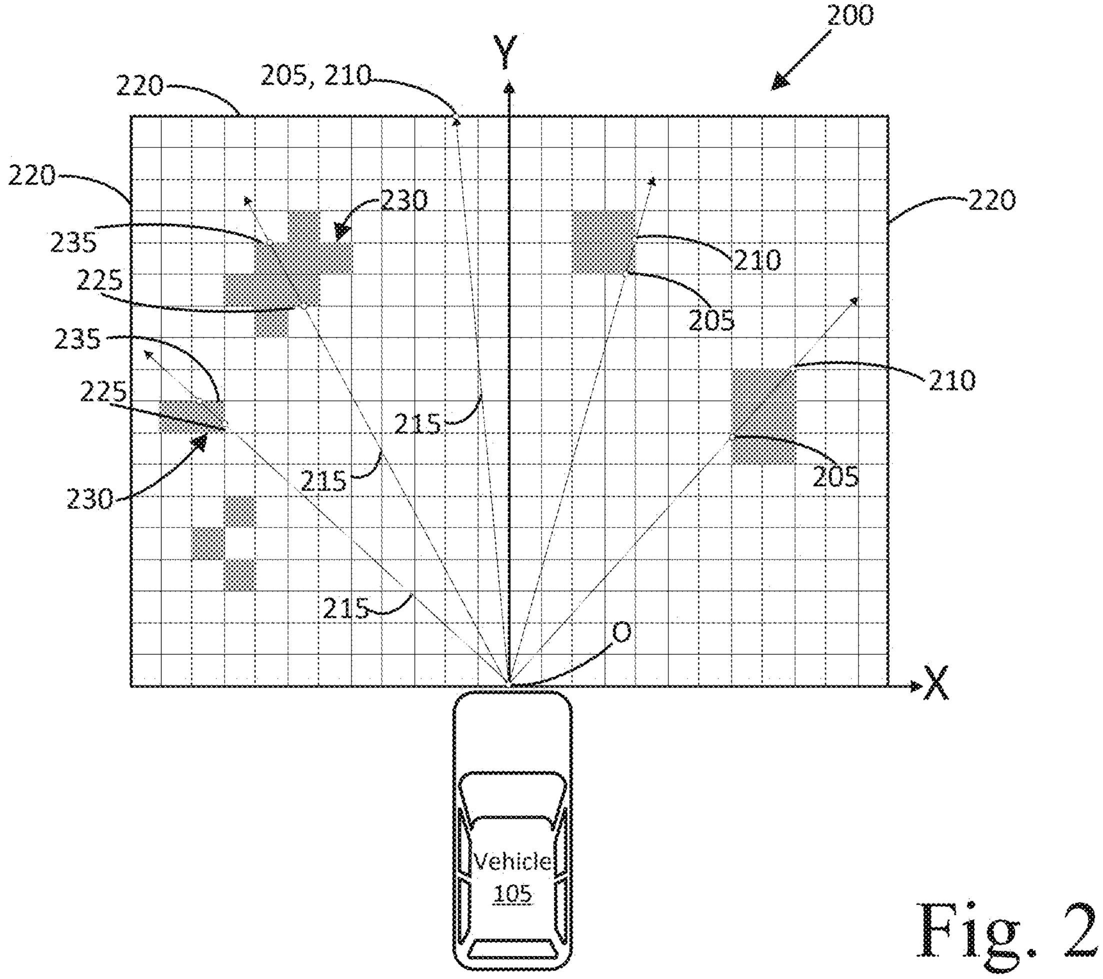
FIG. 2 is a diagram of an example occupancy grid.
Figure 3:
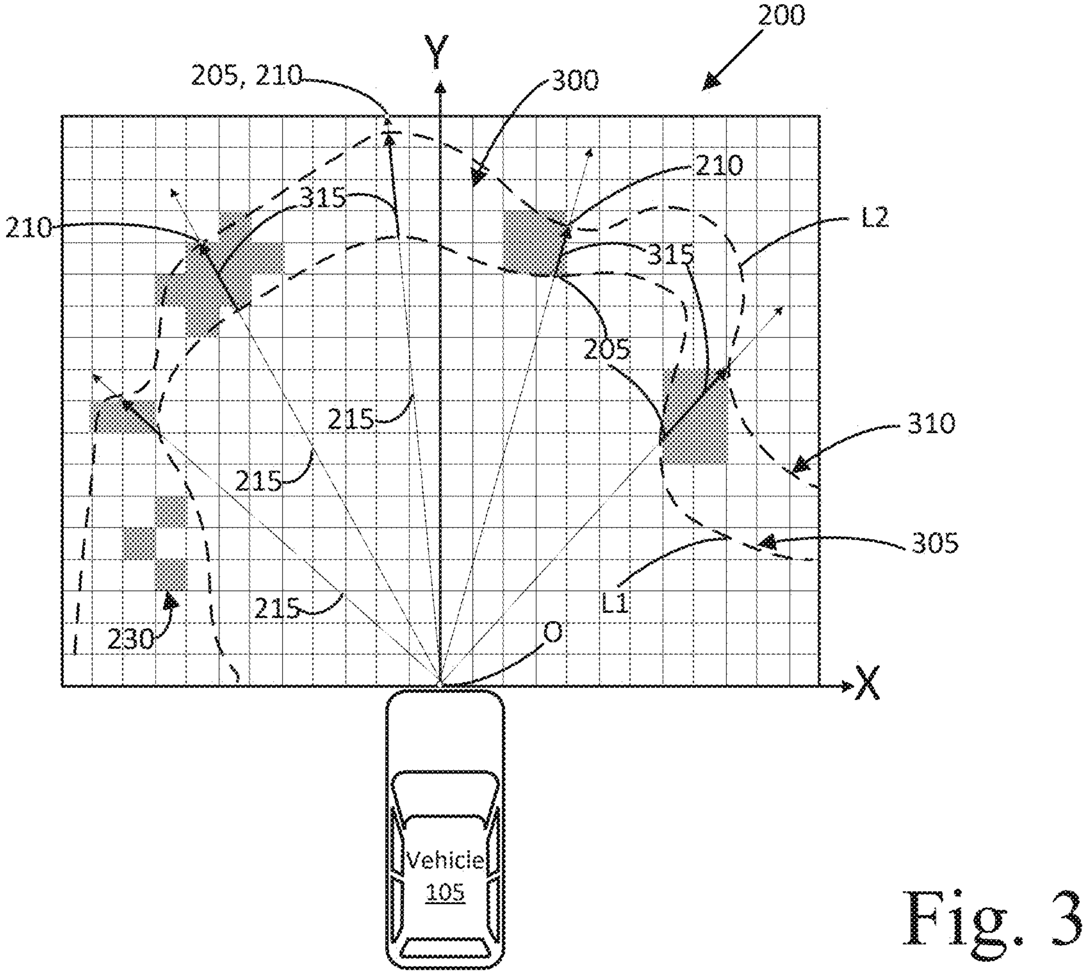
FIG. 3 is a diagram of the occupancy grid of FIG. 2 including an example occupancy region.

With reference to FIGS. 1-3, an example vehicle control system 100 includes a vehicle 105. A vehicle computer 110 in the vehicle 105 receives data from sensors 115. The vehicle computer 110 is programmed to generate, in a grid map 200, an occupancy region 300 defined by a first contour 305 representing a set of first points 205 and a second contour 310 representing a set of second points 210. The set of first points 205 is determined for respective rays 215 extending from a source (e.g., the vehicle 105, a component 125, a sensor 115, etc.) by determining a first point 205 at which the respective ray 215 intersects a distal boundary 220 of the grid map 200 or a proximal boundary 225 of an occupied grid cell 230. The set of second points 210 is determined for respective rays 215 extending from the source (e.g., the vehicle 105, a component 125, a sensor 115, etc.) by determining a second point 210 at which the respective ray 215 intersects the distal boundary 220 of the grid map 200 or a distal boundary 235 of the occupied grid cell 230.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, and/or other vehicles (e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135).

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation (e.g., an ASIC for processing sensor data and/or communicating the sensor data). In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in the vehicle computer 110.

The vehicle computer 110 may include programming to operate one or more of vehicle 105 propulsion, steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to (e.g., via a vehicle communications network such as a communications bus as described further below) more than one processor (e.g., included in electronic controller units (ECUs) or the like included in the vehicle 105) for monitoring and/or controlling various vehicle components 125 (e.g., a transmission controller, a steering controller, etc.). The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices (e.g., sensors 115, an actuator 120, ECUs, etc.). Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115 (e.g. front view, side view, etc.) providing images from an area surrounding the vehicle 105. In the context of this disclosure, an object is a physical (i.e., material) item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form (e.g., geo-coordinates such as latitude and longitude coordinates obtained via a navigation system, as is known, that uses the Global Positioning System (GPS)). Additionally, or alternatively, the data can include a location of an object (e.g., a vehicle, a sign, a tree, etc.) relative to the vehicle 105. As one example, the data may be image data of the environment around the vehicle 105. In such an example, the image data may include one or more objects and/or markings (e.g., lane markings) on or along a road. Image data herein means digital image data (e.g., comprising pixels with intensity and color values) that can be acquired by camera sensors 115. The sensors 115 can be mounted to any suitable location in or on the vehicle 105 (e.g., on a vehicle 105 bumper, on a top of a vehicle 105, etc.) to collect images of the environment around the vehicle 105.

The vehicle 105 actuators 120 are implemented via circuits, chips, or other electronic and/or mechanical components that can actuate various vehicle subsystems in accordance with appropriate control signals as is known. The actuators 120 may be used to control components 125, including propulsion and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a park assist component, an adaptive cruise control component, an adaptive steering component, etc.

In addition, the vehicle computer 110 may be configured for communicating via a vehicle-to-vehicle communication module 130 or interface with devices outside of the vehicle 105 (e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications)). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. The label "V2X" is used herein for communications that may be vehicle-to-vehicle (V2V) and/or vehicle-to-infrastructure (V2I), and that may be provided by communication module 130 according to any suitable short-range communications mechanism (e.g., DSRC, cellular, or the like).

The network 135 represents one or more mechanisms by which a vehicle computer 110 may communicate with remote computing devices (e.g., the remote server computer 140, another vehicle computer, etc.). Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device (i.e., including one or more processors and one or more memories) programmed to provide operations such as disclosed herein. Further, the remote server computer 140 can be accessed via the network 135 (e.g., the Internet, a cellular network, and/or or some other wide area network).

FIG. 2 is a diagram of an example grid map 200. The grid map 200 may be a dynamic occupancy grid map or a static occupancy grid map. A static occupancy grid map is an array or graph of grid cells that model occupancy (i.e., data showing objects and/or environmental features) of respective locations of the environment around the vehicle 105 of respective grid cells. A dynamic occupancy grid map is a static occupancy grid map that further includes kinematic attributes (i.e., data describing velocity, turn-rate, etc.) of respective grid cells. For illustration purposes, the grid map 200 is shown in a two-dimensional plane (e.g., an x-y plane); however, it should be understood that the grid map 200 could show in three-dimensional space (e.g., a Cartesian coordinate system defined by x, y, and z axes). The grid map 200 may be generated based on sensor 115 data. For example, a vehicle can include one or more optical sensors such as video cameras, one or more ultrasonic sensors, and/or one or more short range radar sensors. Respective ones of these sensors, following acquisition and processing by a computer included in the vehicle, can produce location and velocity data regarding moving objects. Combining data from two or more sensors can enhance accuracy, resolution, and reliability of acquired moving object data.

Vehicle 105 sensors 115 can provide data in a two-dimensional plane, e.g., an x-y plane. Each grid cell corresponds to a location that is specified with respect to a vehicle coordinate system, e.g., a Cartesian coordinate system having an origin O at a front of the vehicle 105. Each grid cell may be identified with a grid index x,y with respect to the origin O. Each grid cell includes information regarding the presence or absence of an object in the respective grid cell of the grid map 200. An occupancy of a grid cell, i.e., whether an object or part of an object is detected in the cell, may be specified by a probability (or a percentage) that an object is detected in the grid cell (i.e., the grid cell is occupied). In the present illustration, the grid cells when displayed are shown as white (e.g., indicating that no object is detected or unoccupied) when the probability is less than a threshold (e.g., 50 percent) or as grey (e.g., indicating that an object is present or occupied) when the probability is greater than or equal to the threshold. The threshold may be stored (e.g., in a memory of the vehicle computer 110). Each grid cell may further include information regarding a velocity (e.g., a direction and a magnitude) in the respective grid cell of the grid map 200. A velocity may be represented with a color included in a color wheel or palette.

The vehicle computer 110 may be programmed to, upon receiving sensor 115 data, initialize the grid map 200. After initialization, the vehicle computer 110 may be programmed to sample occupancy of the grid map 200 along a plurality of rays 215 extending from the origin O (i.e., the front of the vehicle 105, a sensor 115, etc.) of the vehicle coordinate system. The vehicle computer 110 may sample the occupancy of the grid map 200 along any suitable number of rays 215 (e.g., determined based on a desired resolution). The rays 215 may be evenly distributed over a range (e.g., 180 degrees). That is, respective angles between adjacent rays 215 may be the same as each other.

Sampling the occupancy of the grid map 200 includes determining a first point 205 at which the respective rays 215 intersect a distal boundary 220 of the grid map 200 or a proximal boundary 225 of an occupied grid cell 230. A distal boundary 220 of the grid map 200 is a boundary that does not intersect the origin O of the vehicle coordinate system. The grid map 200 may, for example, include one boundary intersecting the origin O and three distal boundaries 230, as shown in FIGS. 2-3. As another example, the grid map 200 may include four distal boundaries 220 (i.e., no boundaries intersect the origin O). An occupied grid cell 230 is one in which an object or part of an object is detected within the grid cell. A proximal boundary 225 of an occupied grid cell 230 is a boundary that is intersected first (i.e., before any other boundary of the cell 230) by a ray 215 extending away from the origin O of the coordinate system.

Sampling the occupancy of the grid map 200 further includes determining a second point 210 at which the respective rays 215 intersect the distal boundary 220 of the grid map 200 or a terminal boundary 235 of the occupied grid cell 230. A terminal boundary 235 of the occupied grid cell 230 is a boundary that is intersected last (i.e., after another boundary of the cell 230) by a ray 215 extending away from the source. That is, the proximal boundary 225 of an occupied grid cell 230 is arranged closer to the source than the terminal boundary 235 of the occupied grid cell 230 relative to a direction of a respective ray 215 intersecting the occupied grid cell 230.

One or more occupied grid cells 230 may be intersected by the respective rays 215, or no occupied grid cells 230 may be intersected by the respective rays 215. In the situation where one occupied grid cell 230 is intersected by the respective ray 215, the first point 205 is determined at which the respective ray 215 intersects the proximal boundary 225 of the occupied grid cell 230, and the second point 210 is determined at which the respective ray 215 intersects the terminal boundary 235 of the occupied grid cell 230. In the situation where multiple occupied grid cells 230 are intersected by the respective rays 215, the first point 205 is determined at which the respective ray 215 intersects the proximal boundary 225 of a proximal (i.e., closest to the source relative to the other occupied grid cell(s)) occupied grid cell 230, and the second point 210 is determined at which the respective ray 215 intersects the terminal boundary 235 of terminal (i.e., farthest from the source relative to the other occupied grid cell(s)) occupied grid cell 230. In the situation where no occupied grid cell 230 is intersected by the respective ray 215 (i.e., in an absence of an occupied grid cell 230 located along the respective ray 215), the first and second points 205, 210 are determined at which the respective ray 215 intersects the distal boundary 230 of the grid map 200. That is, the first point 205 is a same point as the second point 210.

Turning now to FIG. 3, upon determining the first and second points 205, 210 for the respective rays 215, the vehicle computer 110 can generate an occupancy region 300 in the grid map 200. The occupancy region 300 represents an area in the grid map 200 defined by occupied grid cells 230 and grid cells that may be occupied based on the grid cells being adjacent to occupied grid cells 230. That is, the occupancy region 300 represents a probabilistic region through which the vehicle 105 may not be permitted to operate (e.g., due to a (likely) presence of occupied grid cells). The occupancy region 300 is bounded by a first contour 305 and a second contour 310. The first contour 305 is arranged between the source and the second contour 310. The first and second contours 305, 310 are generated by interpolating between respective first points 205 and respective second points 210 of adjacent respective rays 215.

To interpolate between the respective first points 205 of adjacent respective rays 215, the vehicle computer 110 determines a first best fit line L1 based on the first points 205. The first best fit line L1 is a line through a set of the first points 205 that minimizes respective distances between the respective first points 205 and the line L1. The first best fit line L1 represents the first contour 305. To interpolate between the respective second points 210 of adjacent respective rays 215, the vehicle computer 110 determines a second best fit line L2 based on the second points 210. The second best fit line L2 is a line through a set of the second points 210 that minimizes respective distances between the respective second points 210 and the line L2. The second best fit line L2 represents the second contour 310 of the occupancy region 300. The vehicle computer 110 can determine the first and second contours 305, 310 using known calculation methods (e.g., linear least squares, linear regression, random sample consensus (RANSAC), etc.).

After determining the first and second contours 305, 310, the vehicle computer 110 may be programmed to downsample the first and second contours 305, 310. The vehicle computer 110 may downsample the first contour 305 based on a Douglas-Peucker algorithm. The Douglas-Peucker algorithm is described in "Algorithms for the Reduction of the Number of Points Required to Represent a Digitized Line or Its Caricature", David H. Douglas, and Thomas K. Peucker, THE CANADIAN CARTOGRAPHER, Vol. 10, No. 2, December 1973, pp 112-122. The first contour 305 is formed from linear segments between the first points 205. A Douglas-Peuker algorithm is an iterative end-point fit algorithm that simplifies the first contour 305 by eliminating points 205 that are determined to lie within a user-selected threshold value of linear segments. The vehicle computer 110 can downsample the second contour 310 based on the downsampled first contour 305. For example, the vehicle computer 110 can eliminate second points 210 that are on the same respective ray 215 as respective eliminated first points 205. Downsampling the first and second contours 305, 310 can reduce a number of respective points 205, 210 in the respective sets (e.g., by removing points from respective sets that are outliers relative to adjacent points in the respective sets), which can smooth the first and second contours 305, 310 and minimize computational resources required to represent the first and second contours 305, 310.

The vehicle computer 110 can be programmed to generate respective occupancy intervals 315 based on the first and second contours 305, 310. The respective occupancy intervals 315 extend from the first contour 305 to the second contour 310 along the corresponding rays 215. An occupancy interval 315 includes information of the grid cells included in the occupancy region 300 along the respective ray 215. The respective occupancy intervals 315 may define respective radial positions of the occupancy region 300 relative to the vehicle 105. For example, the respective occupancy intervals 315 may include the respective first points 205 on the respective rays 215 included in the first contour 305 and the respective second points 210 on the respective rays 215 included in the second contour 310. Based on the respective first and second points 205, 210, the vehicle computer 110 can determine respective first distances along the respective rays 215 from the vehicle 105 to the first contour 305 and respective second distances along the respective rays 215 from the vehicle 105 to the second contour 310 (e.g., based on the grid map coordinate system and known geometric techniques). The vehicle computer 110 can determine respective radial lengths of the occupancy region 300 (i.e., a length of the occupancy region along the respective ray 215) based on a difference between the respective first and second distances.

The respective occupancy intervals 315 can further include an estimated occupancy of the occupancy region 300. The estimated occupancy is determined based on a statistical aggregation of the probabilities specified by the grid cells included in the respective occupancy interval 315. As one example, the statistical aggregation may be implemented as a weighted average. In such an example, the grid cells included in the respective occupancy intervals 315 may be given respective weights with grid cells closer to the first contour 305 relative to the respective ray 215 having a higher weight than grid cells farther from the first contour 310 (i.e., closer to the second contour 310) relative to the respective ray 215. As another example, the statistical aggregation may be implemented as a Bayesian filter. In such an example, the Bayesian filter may be trained to receive probabilities specified by the grid cells included in the respective occupancy interval 315 as input, and to output the estimated occupancy of the occupancy region 300. As one non-limiting example, the vehicle computer 110 can identify grid cells intersected by the respective occupancy intervals 315 based on the Bresenham line algorithm.

The respective occupancy intervals 315 can further include a first velocity and a second velocity of the occupancy region 300. The first velocity is determined based on the velocity of the grid cell intersected by the first contour 305 and included in the respective occupancy interval 315, and the second velocity is determined based on the velocity of the grid cell intersected by the second contour 310 and included in the respective occupancy interval 315. In a situation in which the grid cell intersected by the respective contour 305, 310 and included in the respective occupancy interval 315 is an occupied grid cell 230, the respective velocity may be the same as a velocity of the object occupying the occupied grid cell 230. In a situation in which the grid cell intersected by the respective contour 305, 310 and included in the respective occupancy interval 315 is an unoccupied grid cell, the respective velocity may be null. Additionally, the respective occupancy intervals 315 can further include a velocity error for the occupancy region 300. The velocity error may be determined based on a statistical aggregation (e.g., a weighted average, a Bayesian filter, etc.) of the first velocity and the second velocity.

The vehicle computer 110 can operate the vehicle 105 based on the occupancy region 300. For example, the vehicle computer 110 can generate a planned path for the vehicle 105 such that the vehicle 105 operates outside of the occupancy region 300. That is, the planned path may be constrained to extend outside of the occupancy region 300. Upon determining the planned path, the vehicle computer 110 can operate the vehicle 105 (e.g., by actuating one or more actuators 120 and/or components 125) along the planned path. While operating the vehicle 105 along the planned path, the vehicle computer 110 can generate an updated occupancy region 300 (e.g., in the same manner as discussed above regarding generating the occupancy region) based on determining, via sensor 115 data obtained while operating the vehicle 105 along the planned path, an updated grid map 200. The vehicle computer 110 can then determine an updated planned path based on the updated occupancy region 300, which allows the vehicle computer 110 to dynamically navigate the vehicle 105 around objects in the environment.

As used herein, a "path" is a set of points, e.g., that can be specified as coordinates with respect to a vehicle coordinate system and/or geo-coordinates, that the computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector (e.g., that includes vehicle location, orientation, speed, etc.) determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \tag{1}$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

Operating the vehicle 105 based on the occupancy region 300 can conserve computational resources by allowing the vehicle computer 110 to control the vehicle 105 without classifying objects as known or unknown types and generating corresponding representations of the objects. Further, the occupancy region 300 reduces an area of a grid map in which the vehicle computer 110 needs to account for objects when controlling the vehicle 105, which can further conserve computational resources as compared to accounting for the entire grid map when controlling the vehicle 105. By conserving computational resources, the vehicle computer 110 can reduce an amount of time required to detect and/or monitor objects around the vehicle 105 and to control the vehicle 105 relative to the detected and/or monitored objects.

Figure 4:
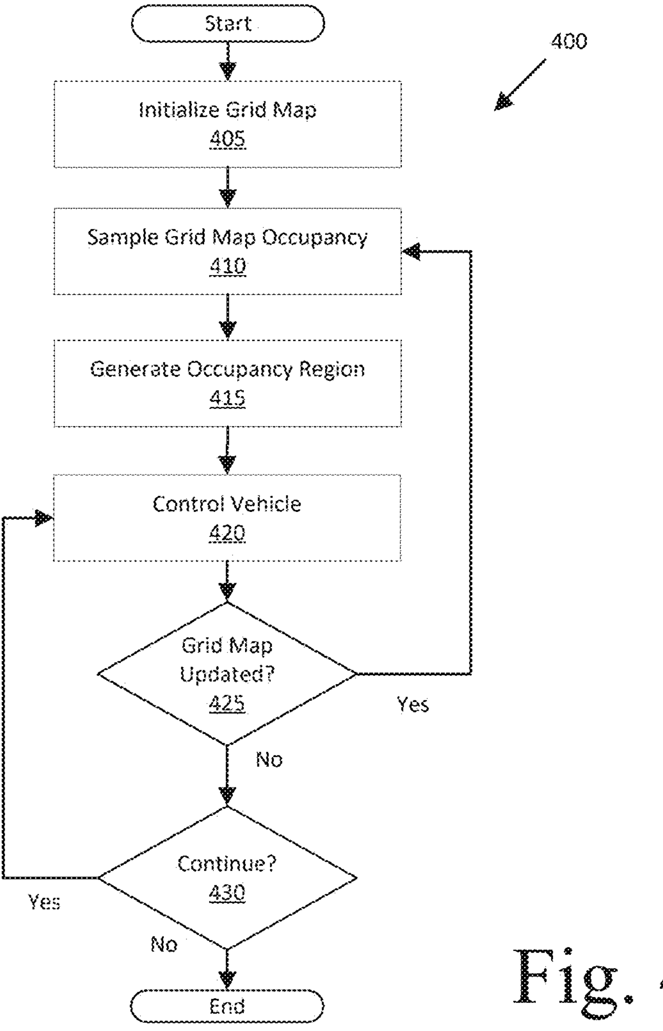
FIG. 4 is an example flowchart of an example process for generating an occupancy region in a grid map.

FIG. 4 is a diagram of an example process 400 for generating an occupancy region 300 in a grid map 200. The process 400 begins in a block 405. The process 400 can be carried out by a vehicle computer 110 included in the vehicle 105 executing program instructions stored in a memory thereof.

In the block 405, the vehicle computer 110 can initialize a grid map 200 based on sensor 115 data, as discussed above. Alternatively, the vehicle computer 110 can receive the grid map 200 from a remote server computer 140 (e.g., via a network 130). The process 400 continues in a block 410.

In the block 410, the vehicle computer 110 samples occupancy of the grid map 200 along a plurality of rays 215 extending from a source (e.g., the vehicle 105, a component 125 thereof, a sensor 115, etc.). As discussed above, sampling the occupancy of the grid map 200 includes determining a first point 205 at which the respective rays 215 intersect a distal boundary 220 of the grid map 200 or a proximal boundary 225 of an occupied grid cell 230, and determining a second point 210 at which the respective rays 215 intersect the distal boundary 220 of the grid map 200 or a terminal boundary 235 of the occupied grid cell 230. The process 400 continues in a block 415.

In the block 415, the vehicle computer 110 generates an occupancy region 300 in the grid map 200. To generate the occupancy region 300, the vehicle computer 110 can determine a first contour 305 and a second contour 310 that bounds the occupancy region 310. The first contour 305 is represented by a first best fit line L1 determined from a set of first points 205, and the second contour 310 is represented by a second best fit line L2 determined from a second of second points 210, as discussed above. The first and second contours 305, 310 may be downsampled, as discussed above. The vehicle computer 110 can generate occupancy intervals 315 based on the first and second contours 305, 310 and the grid cells intersected by respective rays 215, as discussed above. The process 400 continues in a block 420.

In the block 420, the vehicle computer 110 controls the vehicle 105 based on the occupancy region 300. For example, the vehicle computer 110 can generate a planned path for the vehicle 105 such that the vehicle 105 operates outside of the occupancy region 300, as discussed above. The process 400 continues in a block 425.

In the block 425, the vehicle computer 110 determines whether the grid map 200 has been updated. For example, the vehicle computer 110 can receive updated sensor 115 data while controlling the vehicle 105, and can update the grid map based on the updated sensor 115 data. As another example, the vehicle computer 110 can receive an updated grid map from the remote server computer 140 (e.g., via the network 135). If the vehicle computer 110 determines that the grid map 200 has been updated, then the process 400 returns to the block 410. Otherwise, the process 400 continues in a block 430.

In the block 430, the vehicle computer 110 determines whether to continue the process 400. For example, the vehicle computer 110 can determine to continue when the vehicle 105 is powered on. In another example, the vehicle computer 110 can determine not to continue when the vehicle 105 is powered off. If the vehicle computer 110 determines to continue, the process 400 returns to the block 420. Otherwise, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:

generate, in a grid map, an occupancy region defined by a first contour representing a set of first points and a second contour representing a set of second points, wherein the sets of first and second points are determined for respective rays extending from a source by:

determining a number of occupied grid cells that the respective ray intersects, wherein the number is zero, one, or more than one, wherein:

when the respective ray intersects zero occupied grid cells, then determining a point at which the respective ray intersects a distal boundary of the grid map; and when the respective ray intersects one or more occupied grid cells, then determining a first point at which the respective ray intersects a proximal boundary of an occupied grid cell, and determining a second point at which the respective ray intersects the distal boundary of the grid map or a distal boundary of the occupied grid cell; and control a vehicle based on the occupancy region.

2. The system of claim 1, wherein the instructions further include instructions to generate an occupancy interval extending along the respective ray from the first contour to the second contour, the respective occupancy intervals defining respective radial positions of the occupancy region relative to the source.

3. The system of claim 2, wherein the grid map includes a plurality of grid cells specifying a probability of the respective grid cell being occupied by an object and a velocity of the object.

4. The system of claim 3, wherein the respective occupancy intervals include an estimated occupancy based on statistical aggregation of the probabilities specified by the grid cells include in the respective occupancy interval.

5. The system of claim 3, wherein the respective occupancy intervals include a first velocity corresponding to the velocity of the grid cell intersected by the first contour and a second velocity corresponding to the velocity of the grid cell intersected by the second contour.

6. The system of claim 5, wherein the respective occupancy intervals include a velocity error determined based on a statistical aggregation of the first velocity and the second velocity.

7. The system of claim 1, wherein, when the first point is determined at which the respective ray intersects the boundary of the grid map, the second point is a same point as the first point.

8. The system of claim 1, wherein the first contour is represented by a first best fit line interpolated from the set of first points, and the second contour is represented by a second best fit interpolated from the set of second points.

9. A method comprising:

generating, in a grid map, an occupancy region defined by a first contour representing a set of first points and a second contour representing a set of second points, wherein the sets of first and second points are determined for respective rays extending from a source by:

determining a number of occupied grid cells that the respective ray intersects, wherein the number is zero, one, or more than one, wherein:

when the respective ray intersects zero occupied grid cells, then determining a point at which the respective ray intersects a distal boundary of the grid map; and when the respective ray intersects one or more occupied grid cells, then determining a first point at which the respective ray intersects a proximal boundary of an occupied grid cell, and determining a second point at which the respective ray intersects the distal boundary of the grid map or a distal boundary of the occupied grid cell; and controlling a vehicle based on the occupancy region.

10. The method of claim 9, further comprising determining an occupancy interval extending along the respective ray from the first contour to the second contour, the respective occupancy intervals defining respective radial positions of the occupancy region relative to the sensor.

11. The method of claim 10, wherein the grid map includes a plurality of grid cells specifying a probability of the respective grid cell being occupied by an object and a velocity of the object.

12. The method of claim 11, wherein the respective occupancy intervals include an estimated occupancy based on statistical aggregation of the probabilities specified by the grid cells include in the respective occupancy interval.

13. The method of claim 11, wherein the respective occupancy intervals include a first velocity corresponding to the velocity of the grid cell intersected by the first contour and a second velocity corresponding to the velocity of the grid cell intersected by the second contour.

14. The method of claim 13, wherein the respective occupancy intervals include a velocity error determined based on a statistical aggregation of the first velocity and the second velocity.

15. The method of claim 9, wherein, when the first point is determined at which the respective ray intersects the boundary of the grid map, the second point is a same point as the first point.

16. The method of claim 9, wherein the first contour is represented by a first best fit line interpolated from the set of first points, and the second contour is represented by a second best fit interpolated from the set of second points.

* * * * *